Jan. 14, 1958 M. KARLIN 2,820,095

CARRIER-FREQUENCY TELEGRAPHY SYSTEM

Filed May 19, 1954 4 Sheets-Sheet 1

INVENTOR.

MAURICE KARLIN

BY

Fred M. Vogel

CARRIER-FREQUENCY TELEGRAPHY SYSTEM

Filed May 19, 1954 4 Sheets-Sheet 2

INVENTOR.

MAURICE KARLIN

BY

[signature]

CARRIER-FREQUENCY TELEGRAPHY SYSTEM

Filed May 19, 1954

4 Sheets-Sheet 3

INVENTOR.

MAURICE KARLIN

BY

INVENTOR
MAURICE KARLIN
BY
AGENT

United States Patent Office 2,820,095

Patented Jan. 14, 1958

2,820,095

CARRIER-FREQUENCY TELEGRAPHY SYSTEM

Maurice Karlin, Brussels, Belgium, assignor, by mesne assignments, to North American Philips Company, Inc., New York, N. Y., a corporation of Delaware Application May 19, 1954, Serial No. 430,934

Claims priority, application Netherlands May 30, 1953

10 Claims. (Cl. 178—51)

This invention relates to carrier-frequency telegraphy systems for transmitting telegraphy channels which are spread over an intelligence frequency band and divided into four groups located in successive group frequency bands. In order to include as high as possible a number of telegraphy channels in the available intelligence frequency band having a width of, say, 0.3 to 3 or 4 kc./s., it is of importance to minimize the band-width of the successive telegraphy channels for example to reduce it to a width of 100 to 120 c./s. The transmission of the telegraphy signals may then be effected in many different manners, for example by amplitude modulation, frequency shift or the like.

In known telegraphy apparatus of the aforesaid type, each of the individual channels comprises an oscillator circuit gated in the rhythm of the telegraphy signals and an associated channel filter, said channel oscillator directly delivering carrier frequencies located in the group frequency bands concerned. At the receiver end, the telegraphy signals modulated on different carrier frequencies are supplied for frequency selection in parallel-combination to channel filters and, after demodulation, applied to the recording apparatus concerned, for example a reproducing relay.

It has been found that the use of said telegraphy apparatus entails difficulties in practice, since on the one hand the channel filters for very low frequencies, for example 400 to 600 c./s., occupy much space and are expensive and on the other hand troublesome distortion of the transmitted telegraphy signals occurs.

The present invention has for its object to provide a particularly suitable carrier-frequency telegraphy apparatus of the type referred to in the preamble in order to obviate inter alia the aforesaid difficulties.

At the transmitter end, according to the invention the individual channels pertaining to the two central and the high extreme group frequency bands comprise channel oscillators which directly deliver the carrier frequencies within said frequency bands and are directly coupled, through associated channel filters, to the transmitter outlet whilst the individual channels pertaining to the low extreme frequency band comprise channel oscillators and associated channel filters, which channel oscillators deliver successive carrier frequencies located in the low and high central frequency bands, said individual channels being connected to a group modulator with associated group oscillator which delivers a frequency above the low central frequency band, and the output circuit of said group modulator being coupled to the transmitter output via a group filter with a pass band corresponding to the low extreme frequency band.

According to the invention the associated receiver has the feature that the individual channels pertaining to the central and the high extreme group frequency bands comprise channel filters which are tuned to carrier frequencies within said frequency bands and are directly coupled to the receiver input, whilst the individual channels associated with the low extreme frequency band comprise channel filters which are tuned to the carrier frequencies of the low and high central frequency bands, said individual channels being connected to the output circuit of a group demodulator with associated group oscillator which delivers a frequency higher than the low central frequency band, and the input circuit of said group demodulator being connected to the receiver input via a group filter with a pass band corresponding to the low extreme frequency band.

The measures according to the invention permit on the one hand a simple construction of the group filter, whereas on the other hand no particular requirements are imposed on the stability of the group selector.

In order that the invention may be readily carried into effect it will now be described in greater detail with reference to the accompanying drawings, given by way of example, in which Fig. 1 shows a telegraphy system according to the invention, which comprises a transmitter and an associated receiver.

Figure 1:
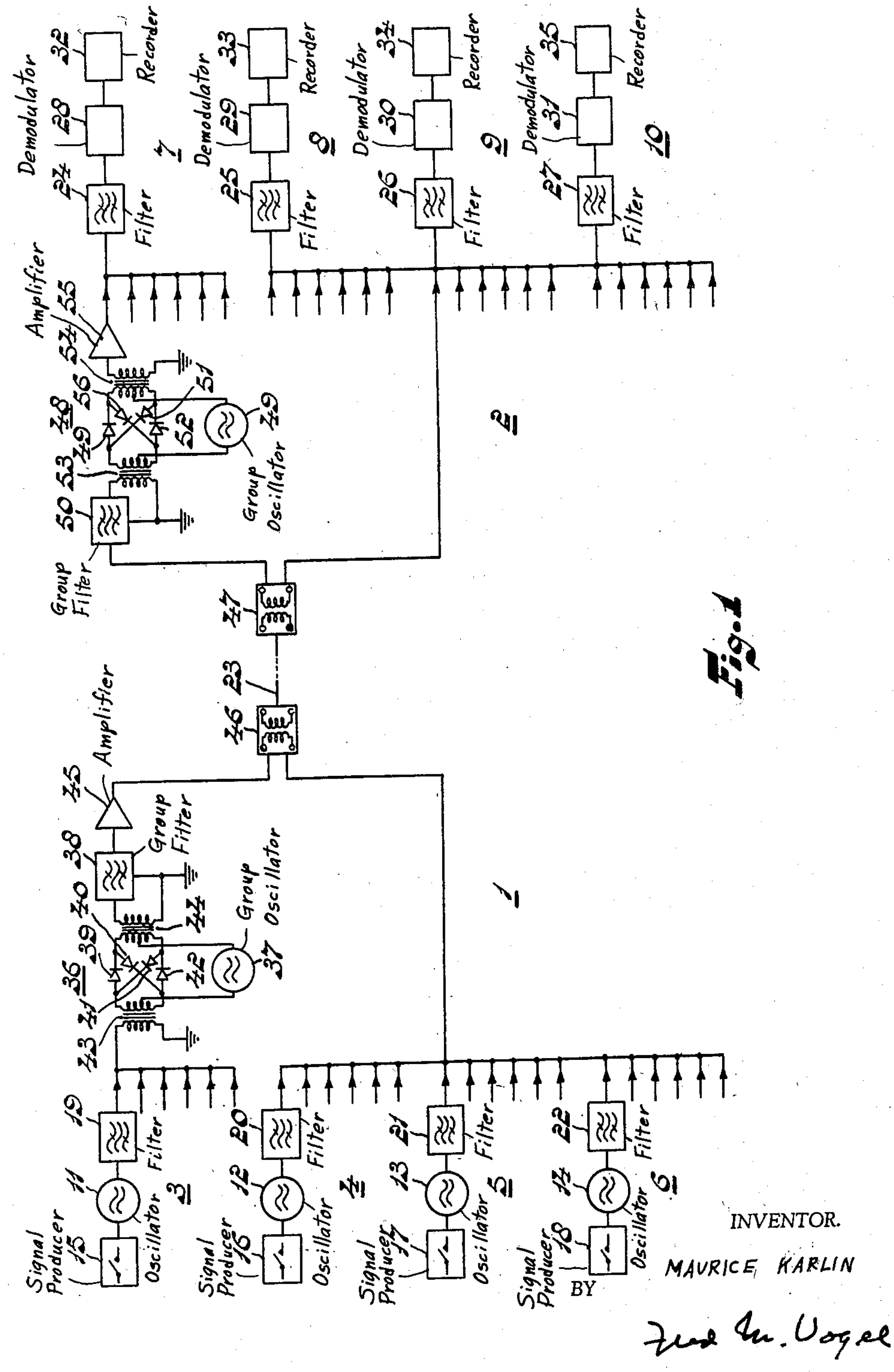

Fig. 1 shows a 24 channel carrier-frequency telegraphy apparatus according to the invention, which comprises a transmitter 1 and a receiver 2 for the transmission of transmitting channels and receiving channels respectively which are spread over an intelligence frequency band and divided into four groups each of six channels located in successive group frequency bands, the groups of transmitting channels and receiving channels being designated 3 to 6 and 7 to 10 respectively.

The transmitting and receiving channels respectively are similar, so that only the first channel of each channel group is shown in block-schematic form in the drawing.

Each transmitting channel comprises an oscillator 11 to 14, a signal producer 15 to 18, for example for generating telegraphy signals characterized by frequency shifts, and a channel filter 19 to 22, the telegraphy signals coming from the several channels being commonly delivered to a transmission line 23. At the receiver end, the telegraphy signals modulated to different carrier frequencies are supplied via channel filters 24 to 27 to demodulating devices 28 to 31 whereof the output voltage controls recording apparatus 32 to 35, for example a reproducing relay.

Figure 5:
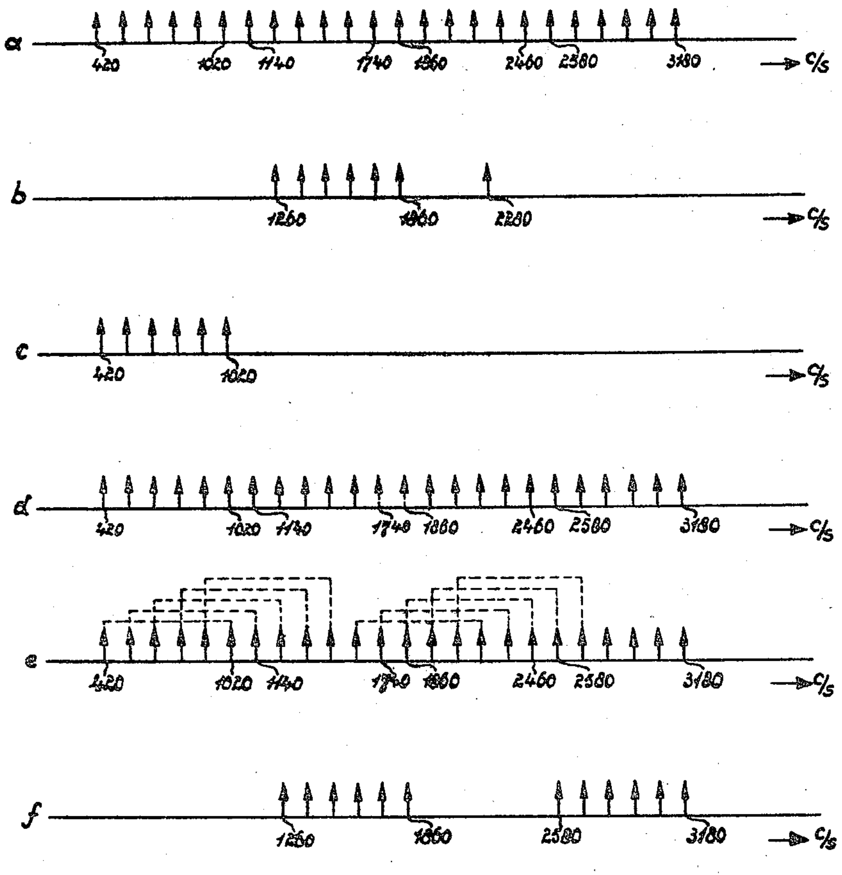
Fig. 5 shows frequency diagrams to explain the apparatus depicted in Figures 1 to 4.

Fig. 5*a* shows the frequency position of the carrier frequencies pertaining to the several transmission channels, which frequencies are within the frequency band of 420 to 3180 c./s. and have a frequency difference of 120 c./s. with respect to one another. Six successive carrier frequencies are each time united into a group, so that the several channel groups comprise 3 to 7, 4 to 8, 5 to 9, 6 to 10 carrier frequencies of 420 to 1020 c./s., 1140 to 1740 c./s., 1860 to 2460 c./s. and 2580 to 3180 c./s respectively.

In said transmitter, according to the invention, the individual channels pertaining to the two central and the high extreme group frequency bands comprise channel oscillators, for example 12, 13 and 14 respectively, which directly deliver the carrier frequencies within said frequency bands and are directly coupled to the transmitter output via associated channel filters, for example 20, 21 and 22, whilst the individual channels pertaining to the low extreme frequency band comprise channel oscillators, for example 11 and associated channel filters, for example 19, said channel oscillators delivering successive carrier frequencies within the two central frequency bands. Said individual channels are connected to a group modulator 36 with associated group oscillator 37 which delivers a frequency in excess of the low central frequency band, the output circuit of said group modulator being coupled to the transmitter output via a group filter 38 with a pass band corresponding to the low extreme frequency band.

With a pass band of 120 c./s. the channel filters 19 of the individual channels pertaining to the low extreme group frequency band are tuned to frequencies within the low and high central frequency bands which frequency range permits the use of simple and cheap channel filters having the desired selective properties, the advantage moreover being obtained that for said frequencies the channel filters have a comparatively small size.

In this embodiment carrier-frequencies of 1260 c./s. to 1860 c./s. (Fig. 5*b*) occur across the output circuit of the individual channels 3 pertaining to the low extreme frequency band, which carrier frequencies are comprised in the frequency range of the second lowest carrier-frequency of the low central band inclusive of the lowest carrier-frequency of the high central band. The group carrier-frequency required for group modulation from said carrier-frequencies 1260 c./s. to 1860 c./s. to the low extreme frequency band 420 c./s. to 1020 c./s. (Fig. 5*c*) is comparatively low, in the present example 2280 c./s., which is of particular importance in connection with stability requisites imposed on the group oscillator. As a matter of fact, a frequency variation of, say, a few c./s. of the group oscillator within the very small channel width of 120 c./s. used involves a considerable signal distortion and a rise of the cross-talk level to adjacent telegraphy channels.

In said circuit-arrangement the group modulator is a ring modulator comprising four rectifier cells 39 to 42 situated between the ends of the secondary winding of an input transformer 43 and the ends of the primary winding of an output transformer 44, the output voltage of group oscillator 37 being supplied to the central taps of said transformer windings, and the output circuit of channel group 3 being connected to the primary winding of the input transformer 43.

In the case of modulation of the frequencies 1260 c./s. to 1860 c./s. with the group oscillator frequency of 2280 c./s. there occur across the output circuit of the ring modulator 36, besides the desired difference frequency of 420 c./s. to 1020 c./s., mainly the sum frequencies of 3540 c./s. to 4140 c./s. and the input voltage of 1260 c./s. to 1860 c./s. By omitting in channel group 3 the lowest carrier frequency of the low central group frequency band (1140 c./s.) it is achieved that the frequency interval between the desired frequency band 420 c./s. to 1020 c./s. and the undesired frequencies 1260 c./s. to 1860 c./s. is sufficient to realize a damping of, say, 25 to 30 db of said undesired frequencies by means of a very simple group filter 38. It is to be noted that disturbing frequencies of 1260 c./s. to 1860 c./s. within the central group frequency bands, are additionally weakened by, say, 20 to 25 db when using a ring modulator 36.

The frequencies of 420 c./s. to 1020 c./s. thus produced across the output circuit of the group filter 38 are supplied after amplification in the amplifier 45, jointly with the output voltages of the channel groups 4, 5, 6 to the transmission line 23 via a hybrid transformer 46 which decouples the output circuit of the amplifier 45 and the channel groups 4, 5, 6.

At the receiver end, the incoming signals are delivered to a matching transformer 47 designed as a hybrid transformer which decouples on the one hand the individual channel groups 8, 9, 10 pertaining to the two central and high extreme group frequency bands and on the other hand the individual channels 7 pertaining to the low group frequency band. At the receiver end, the telegraphy signals are handled reciprocally with respect to those at the transmitter end.

In said receiver apparatus, according to the invention, the individual channels 8, 9, 10 pertaining to the central and the high extreme group frequency bands comprise channel filters, for example 25, 26, 27 which are tuned to carrier frequencies within said frequency bands and are directly coupled to the receiver input, whilst the individual channels 7 pertaining to the low extreme frequency band comprise channel filter 24 that are tuned to the carrier-wave frequencies within the low and high central frequency bands. The last-mentioned individual channels are connected to the output circuit of a group demodulator 48 with associated group oscillator 49 which supplies a frequency in excess of the low central frequency bands, the input circuit of said group modulator 48 being connected to the receiver input via a group filter 50 with a pass-band corresponding to the low extreme frequency band.

In this arrangement, the channel filters of channel group 7 pertaining to the low extreme frequency band are tuned to channel carrier-frequencies of 1260 c./s. to 1860 c./s., since the low extreme carrier-frequencies of 420 c./s. to 1020 c./s. supplied via the group filter are transferred, by group demodulation with a carrier-frequency of 2280 c./s., to the frequency range of 1260 c./s. to 1860 c./s.

In this circuit-arrangement, the group de-modulator 48 is a ring modulator comprising four rectifiers 49 to 52 situated between the ends of the secondary winding of the input transformer 53 and the ends of the primary winding of the output transformer 54, the output voltage of the group oscillators 49 having a frequency of 2280 c./s. being supplied to the centre taps of said transformer windings, and the output circuit of group filter 50 being connected to the primary winding of the input transformer 53.

Across the input circuit of the ring modulator there occurs the desired channel frequencies of 420 c./s. to 1020 c./s. and, moreover, the telegraphy signals, weakened by group filter 50, of the remaining channels, particularly the channel frequencies within the band of 1260 c./s. to 1860 c./s. being undesired since these frequencies correspond to the tuning frequencies of the channel filters of the channel group 7 concerned. The frequency interval between said undesired frequencies and the pass-band of group filter 50 is sufficient to realise a considerable damping of, say, 25 to 30 db by means of a simple group filter and said undesired frequencies are moreover weakened by, say, 20 to 25 db by the ring modulator 48.

The output voltage thus produced across the output circuit of the ring modulator 48, is supplied via an amplifier 55 to the channel apparatus of the channel group 7 for further handling.

Alternatively, of course, a different frequency band within the two central frequency bands may be used for the channel frequencies of the low extreme frequency band.

Figure 2:
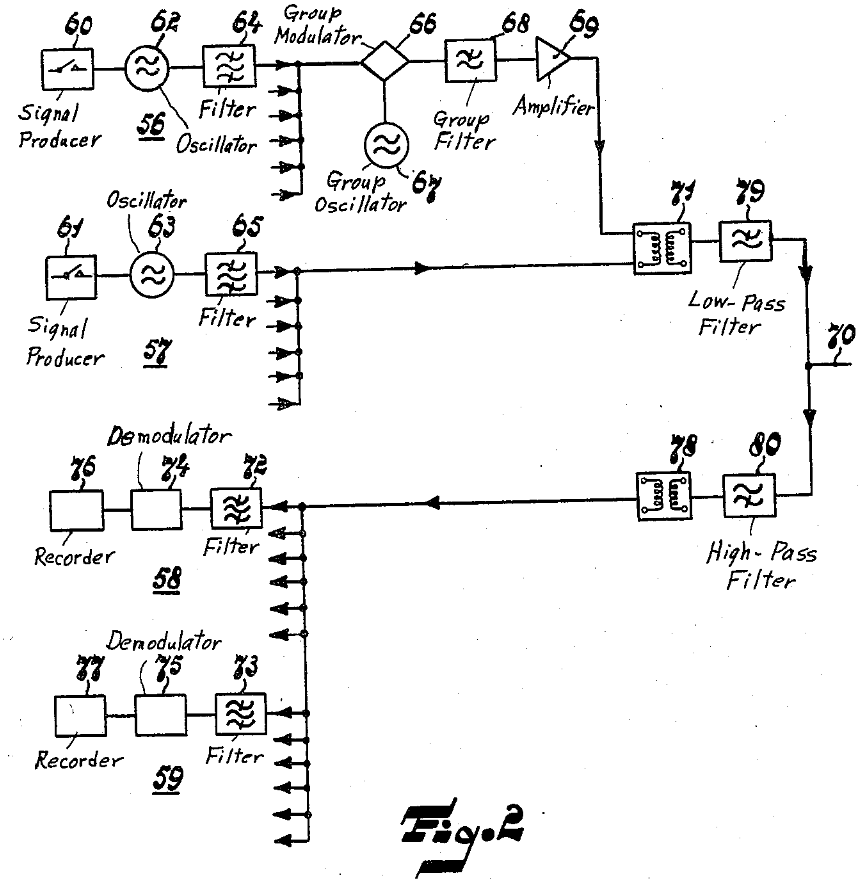
Fig. 2 shows a terminal station of a telegraphy system according to the invention, designed for two-way multiplex traffic over a two-wire link.

Fig. 2 shows a terminal station of a carrier-frequency system for two-way multiplex traffic over a two-wire circuit according to the invention, the system comprising four channel groups 56 to 59 within successive group frequency bands, the groups 56, 57 with the low carrier-frequencies being used for the forward traffic and the groups 58, 59 with the high carrier-frequencies being employed for the return traffic. The first channel of each transmitting and receiving channel group is shown in the drawing.

Each transmitting channel comprises a signal producer 60, 61 an oscillator 62, 63 and a channel filter 64, 65, the oscillator 63 of channel group 57 with the low central group frequency band directly supplying the carrier-frequencies within said frequency band, whilst the oscillators 62 pertaining to the individual channels of group 56 supply frequencies within the two central frequency bands and these individual channels are connected to a group modulator 66 in the form of a ring modulator with associated group oscillator 67 which supplies a carrier-frequency higher than the low central frequency bands. The output circuit of group modulator 66 is connected to a group filter 68 with a pass-band corresponding to the low extreme frequency band. After amplification in an amplifier 69, the output voltage of group filter 68 is supplied, jointly with the output voltage of channel group 57, to a transmission line 70 via a hybrid transformer 71.

The receiving channels 58, 59 pertaining to the high central and high extreme frequency bands comprise channel filters 72, 73, which are tuned to carrier frequencies, occurring within said frequency band, demodulators 74, 75 and recording apparatus 76, 77, the channel filters 72, 73 being directly linked to an input transformer 78.

In order to avoid troublesome reaction between the transmitting channels and the receiving channels, between which a high level difference exists, the transformers 71, 78 are connected to the transmission line 70 via a directional network comprising a low-pass filter 79 and a high-pass filter 80. The frequency interval between the transmitting and receiving channels, which is required for carrying out said step, is obtained by omitting the transmitting channel with the highest carrier frequency (1740 c./s.) and the receiving channel with the lowest carrier frequency (1860 c./s.), and the frequency interval thus realised permits the use of a very simple directional network.

Fig. *5d* shows the frequency position of the transmitting and receiving carrier-frequencies, the reference numerals being the same as those used in Fig. 1.

For transmission traffic use is made of six channels of 420 c./s. to 1020 c./s. of the low extreme group and five channels of 1140 c./s. to 1620 c./s. of the low central group, whilst for the receiving traffic six channels with frequencies of 2580 c./s. to 3180 c./s. of the high extreme group and five channels of 1980 c./s. to 2460 c./s. of the high central group are used. The channels comprising the carrier frequencies of 1740 c./s. and 1860 c./s. indicated in broken lines, which pertain to the central frequency bands, are omitted in this case.

Figure 3:
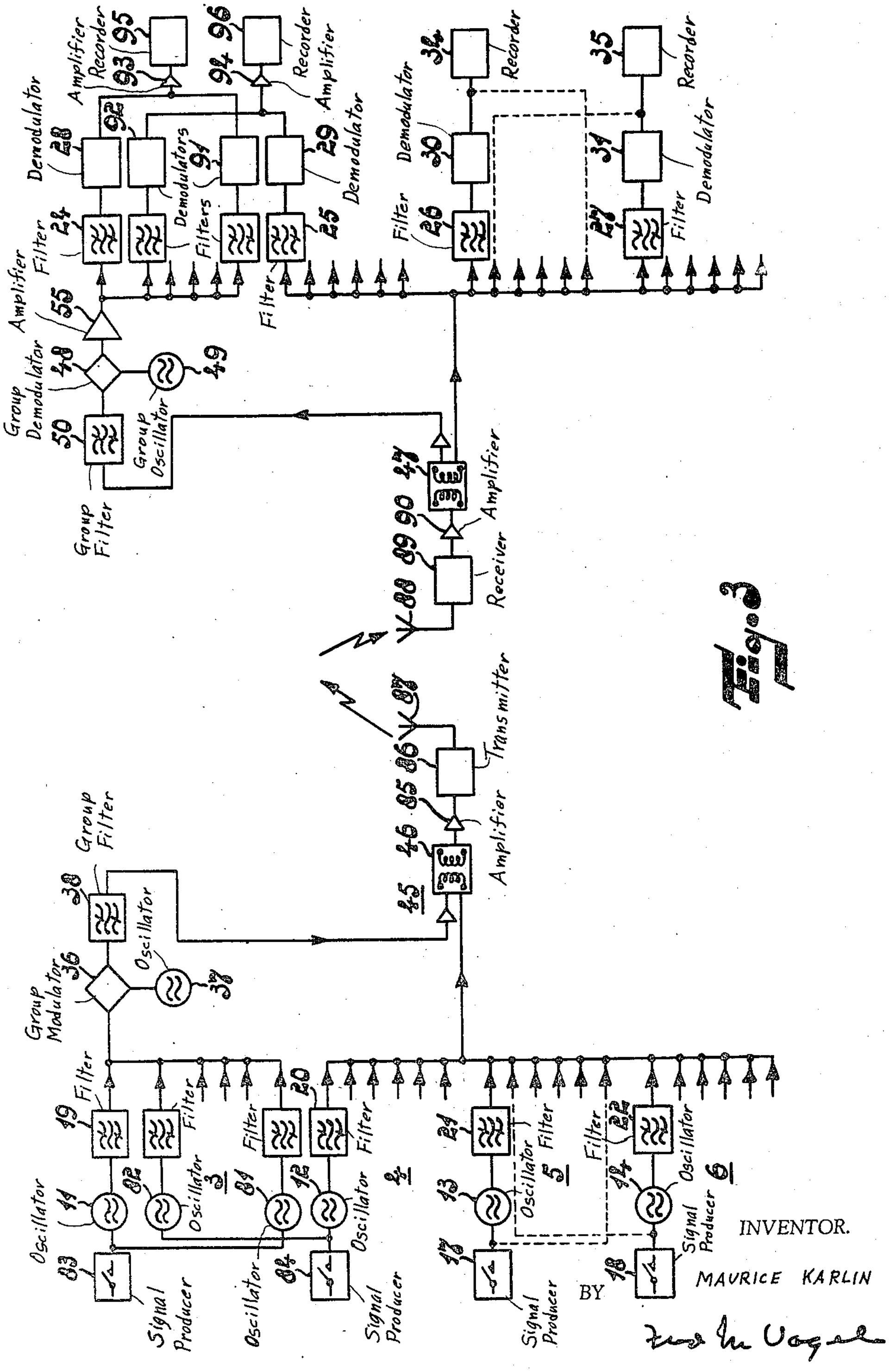
Fig. 3 shows a telegraphy system according to the invention, in which a telegraphy signal is simultaneously transmitted over several telegraphy channels.

Fig. 3 shows a carrier-frequency telegraphy system comprising a transmitting device and a receiving device for radio communication which uses frequency diversity in order to avoid trouble due to a failing telegraphy channel, for example on account of selective fading, that is to say that one and the same telegraphy signal is simultaneously passed over two different telegraphy channels spaced apart by, say, at least 480 c./s.

The construction of the carrier-frequency telegraphy system substantially corresponds to the example described with reference to Fig. 1, corresponding elements bearing the same reference numerals.

In this form, the channel oscillators 11, 81, 12, 82 at the transmitter end, which pertain to telegraphy channels having a frequency difference of 600 c./s. with respect to one another, are simultaneously controlled by one and the same signal producer 83 and 84 respectively. Fig. *5e* shows the frequency diagram for the carrier-frequencies, the carrier-frequencies linked by broken lines serving to transmit one and the same telegraphy signal.

The signals thus derived from the output circuits of the several channel groups are delivered via an output transformer 46 and an amplifier 85 to a transmitter 86 whereof the output circuit is connected to a transmitter antenna 87.

At the receiver end, the signals from a receiving antenna 88 are delivered to a receiver 89 comprising a demodulator and, after amplification in an amplifier 90, supplied to the receiver transformer 47 for further handling in the channel apparatus.

In this circuit arrangement, the output voltages of the channel demodulators 28, 91 and 29, 92 respectively, across whose output circuits the same telegraphy signals occur, are applied to the input circuits of amplification stages 93 and 94 respectively, which are respectively connected to a common recording apparatus 95, 96. In this manner trouble due to a failing channel, for example on account of selective fading, is practically avoided.

Figure 4:
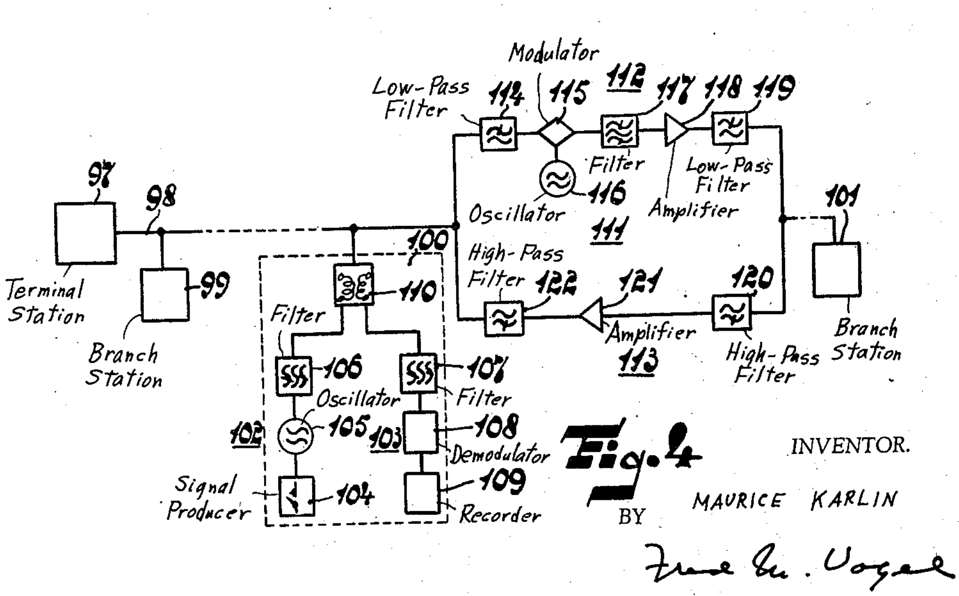
Fig. 4 shows a telegraphy system for two-way multiplex traffic between a terminal station and a plurality of branch stations in the transmission path.

Fig. 4 shows a device according to the invention for two-way multiplex traffic between a terminal station 97 and a plurality of branch stations 99, 100, 101 and so on arranged along a two-wire line 98, the terminal station 100, shown in blockform, corresponding to the terminal station described with reference to Fig. 2.

The branch stations 99, 100, 101 and so on are structurally similar and each comprise a small number of transmitting and receiving channels. In this figure, only the branch station 100 is shown in greater detail.

The branch station 100 comprises a transmitting channel 102 and a receiving channel 103, the transmitting channel comprising a signal producer 104, an oscillator 105 and a channel filter 106, and the receiving channel 103 comprising a channel filter 107, a demodulator 108 and recording apparatus 109. The branch station is connected to the two-wire line through a transformer 110 having a high transformation ratio. As a matter of fact, a high output impedance of the branch station has the advantage of minimizing the influencing of the transmission properties of the two-wire line 98.

For forward traffic communication of the terminal station 97 with the nearest branch stations 99, 100 is effected over the low central frequency band (1140 c./s. to 1740 c./s.) and for return traffic over the high central frequency band (1860 c./s. to 2460 c./s.). For example, the transmitting and the receiving frequencies of the branch station 100 are 1260 c./s. and 2340 c./s. respectively.

For the remoter branch stations the low and the high extreme frequency bands are employed for forward traffic and return traffic respectively, hence group demodulation of the channels 420 c./s. to 1020 c./s. pertaining to the low extreme frequency band should be used in each of said branch stations when the available receiving channel types are to be employed.

A considerable saving in apparatus is obtained by providing, after branching the central group frequency bands, a transposition unit 111 in the two-wire line, which unit transposes in the aforesaid manner, described above in connection with the group modulator 48 in Fig. 1, the low extreme group frequency band, which serves for multiplex traffic with the remoter branch stations 101, to the central group frequency bands and, moreover, suppresses the central frequency bands.

The transposition unit 111 shown in the drawing comprises two parallel-connected branches 112 and 113 which are used in said sequence for forward and return traffic. The branch for forward traffic successively comprises a low-pass filter 114 passing the low extreme frequency bands, a ring modulator 115 connected to an oscillator 116 with a frequency of 2280 c./s., a group filter 117 with a pass-band corresponding to the low extreme frequency band transposed to the central frequency band, an amplifier 118, and a low-pass filter 119 which is connected to the output of the amplifier and passes the frequencies of 1260 c./s. to 1860 c./s. The branch 113 for the return traffic comprises the cascade combination of a high-pass filter 120 passing the high extreme frequency band, an amplifier 121 and a high-pass filter 122 which is connected to the output of the amplifier and passes the high extreme frequency band, the filters 114, 122 and 119, 120 respectively at the ends of the branches jointly acting as a directional network for forward and return traffic.

The frequencies shown in Fig. *5f* are used for the branches 101, etc., which are located remotely from the transposition unit 111, 113 with respect to the terminal station 97, the frequencies 1260 c./s. to 1860 c./s. being used for the forward traffic and the frequencies 2580 c./s. to 3180 c./s. being employed for the return traffic.

It is pointed out that for obtaining a directional network of simple construction it may be of importance to omit the channels with the lowest frequency of the high extreme frequency band (2580 c./s.) and with the highest frequency of the low extreme frequency band (1020 c./s.).

What is claimed is:

1. A carrier-wave telegraphy system comprising a plurality of frequency channels lying in an intelligence-frequency band, said channels being arranged in four frequency groups lying in four successive group-frequency bands thereby to form a low-frequency band, a lower central-frequency band, a higher central-frequency band, and a high-frequency band, transmitter apparatus having an output circuit and comprising a plurality of channel oscillators associated respectively with each of said frequency channels, the channel oscillators associated with the channels in said central-frequency bands and said high-frequency band having different frequencies lying respectively in the channels of said central-frequency bands and said high-frequency band, and the channel oscillators associated with the channels in said low-frequency band having different frequencies lying in said central-frequency bands, a plurality of channel filters connected respectively between the channel oscillators of said central-frequency and high-frequency bands and said output circuit and tuned respectively to the frequencies of the last-named channel oscillators, a low-band group modulator comprising a signal-mixing circuit and a group oscillator for producing oscillations having a frequency higher than the frequency range of said lower central-frequency band, a plurality of channel filters connected respectively between the channel oscillators associated with said low-frequency band and said mixing circuit and tuned respectively to the frequencies of the last-named channel oscillators, means for feeding oscillations from said group oscillator to said mixing circuit whereby said group modulator converts the oscillations of the channel oscillators associated with said low-frequency band into oscillations falling respectively in the frequency channels of said low-frequency band, and a group filter having a passband for said low-frequency band and connected between the output of said group modulator and said output circuit.

2. A system as claimed in claim 1, in which said group modulator is a ring modulator, thereby to attenuate undesired modulation frequencies occurring within said central frequency bands.

3. A system as claimed in claim 1, including a receiver comprising an input circuit coupled to said output circuit, a plurality of signal-responsive devices associated respectively with said frequency channels, a plurality of channel filters connected respectively between said input circuit and said devices which are associated with the frequency channels of said central-frequency bands and said high-frequency band, said last-named filters being tuned to the respective frequencies of said last-named frequency channels, a low-band group demodulator comprising a signal-mixing circuit and an oscillator for producing oscillations having a frequency higher than the frequency range of said lower central frequency band, a group filter having a passband for said low-frequency band and connected between said input circuit and said group demodulator, means for feeding oscillations from the last-named oscillator to said mixing circuit whereby said group demodulator converts the oscillations of said low-frequency band into oscillations falling respectively in the frequency channels of said central-frequency bands which correspond in frequency to the frequencies of said channel oscillators associated with the channels, in said low-frequency band, and a plurality of channel filters connected respectively between the output of said group demodulator and said devices which are associated with said low-frequency band and tuned respectively to the frequency channels of the oscillations which occur at the output of said group demodulator.

4. A system as claimed in claim 3, in which said group demodulator is a ring modulator, thereby to attenuate undesired demodulation frequencies occurring within the pass-bands of the last-named channel filters.

5. A system as claimed in claim 1, in which the frequency bandwidths of the frequency channels of said low-frequency band and the frequency bandwidths of the channel oscillators associated with said low-frequency band and having frequencies lying in said central-frequency bands, are identical.

6. A system as claimed in claim 5, in which the frequencies of the channel oscillators associated with said low-frequency band lie in the range extending from the second lowest frequency channel of said lower central-frequency band to and including the lowest frequency channel of said higher central-frequency band.

7. A system as claimed in claim 5 and adapted for two-way multiplex communication, in which the communication in one direction is provided by the transmitter and receiver apparatus for the frequency channels of said high-frequency and higher central-frequency bands, and in which communication in the other direction is provided by the transmitter and receiver apparatus for the frequency channels of said low-frequency and lower central-frequency bands, and including a high-pass filter connected jointly to the channel circuits of said high-frequency and higher central-frequency bands and a low-pass filter connected jointly to the channel circuits of said low-frequency and lower central-frequency bands.

8. A system as claimed in claim 3, including a common signal producer connected to actuate simultaneously a plurality of said channel oscillators, and including a common reproducing device connected to be actuated by a plurality of said signal-responsive devices which are associated with frequency channels corresponding to the frequency channels with which said last-named plurality of channel oscillators are associated.

9. A system as claimed in claim 1, comprising a transmission cable connected to said output circuit, a pair of relatively near branch stations coupled to said cable at points relatively near said transmitter apparatus and adapted to operate respectively in said lower central-frequency band and in said higher central-frequency band, and a pair of relatively distant branch stations coupled to said cable at points relatively distant from said transmitter apparatus and adapted to operate respectively in said low-frequency band and in said high-frequency band, and a transposition unit connected electrically in said cable at a point between said relatively near and distant pairs of branch stations and comprising two parallel-connected branches, one of said branches comprising a cascade connection of a low-pass filter for passing frequencies of said low-frequency band, a modulating circuit comprising a modulator and an oscillator coupled thereto, said last-named oscillator having an oscillation frequency which is higher than the frequency range of said lower central-frequency band, means for feeding oscillations from said last-named oscillator to said modulator whereby said modulating circuit transposes the oscillations of said low-frequency band into oscillations falling respectively in the frequency channels of said central-frequency bands which correspond in frequency to the frequencies of said channel oscillators associated with the channels in said low-frequency band, and a group filter having a frequency pass band corresponding to the said transposed low-frequency band, and the other of said branches comprising a high-pass filter which passes the frequencies of said high-frequency band.

10. A system as claimed in claim 9, including a low-pass directional filter for passing the frequencies of said transposed low-frequency band and connected in the cascade of said one branch of said transposition unit at the end thereof remote from said transmitter apparatus, and further including a high-pass directional filter for passing the frequencies of said high-frequency band and connected in the cascade of said other branch of said transposition unit at the end thereof remote from said transmitter apparatus.

References Cited in the file of this patent

UNITED STATES PATENTS

| | | |
|---|---|---|
| 2,374,567 | Taylor | Apr. 24, 1945 |
| 2,623,123 | Matte | Dec. 23, 1952 |
| 2,630,493 | Neiswinter | Mar. 3, 1953 |
| 2,662,933 | Singer | Dec. 15, 1953 |